United States Patent [19]

Nohl et al.

[11] 4,360,215

[45] Nov. 23, 1982

[54] DRILL HITCH TRANSPORT

[76] Inventors: Arthur H. Nohl; DeWayne A. Nohl; Alvin L. Nohl, Jr., all of 384 8th St., Hancock, Minn. 56244

[21] Appl. No.: 261,502

[22] Filed: May 7, 1981

[51] Int. Cl.³ .............................................. A01B 73/00
[52] U.S. Cl. ................................. 280/413; 172/240; 172/311; 280/43.23; 280/491 D
[58] Field of Search ............... 172/311, 446, 456, 662, 172/776, 240; 280/411 R, 411 A, 411 B, 411 C, 412, 413, 656, 43.23, 491 D; 56/6, 7, 228, 385

[56]   References Cited
       U.S. PATENT DOCUMENTS

| 2,181,270 | 11/1939 | Gorger | 280/411 C |
| 3,548,954 | 12/1970 | Lindemann | 172/311 |
| 3,705,560 | 12/1972 | Lappin | 111/85 |
| 3,738,682 | 6/1973 | Ritter | 280/413 |
| 3,791,673 | 2/1974 | Hornung | 280/411 |
| 3,887,016 | 6/1975 | Hansen | 172/311 |
| 3,971,446 | 7/1976 | Nienberg | 172/311 |
| 3,986,464 | 10/1976 | Uppiano | 111/59 |
| 4,056,149 | 11/1977 | Honnold | 172/311 |
| 4,109,928 | 8/1978 | Watkins | 280/411 |
| 4,157,735 | 6/1979 | Olsson et al. | 172/240 |
| 4,171,022 | 10/1979 | Applequist | 172/311 |
| 4,214,637 | 7/1980 | Applequist | 172/484 |

FOREIGN PATENT DOCUMENTS

| 2415419 | 9/1979 | France | 172/311 |
| 683657 | 9/1979 | U.S.S.R. | 280/411 C |
| 571209 | 10/1977 | U.S.S.R. | 172/311 |

Primary Examiner—Richard T. Stouffer
Attorney, Agent, or Firm—Kinney, Lange, Braddock, Westman and Fairbairn

[57]   ABSTRACT

A hitch transport assembly for use with end wheel grain drills which permits pulling a plurality of such end wheel grain drills in an end to end relationship across the field, and which permits folding the outer drills rearwardly into a transport position for moving the drills from field to field. A frame assembly supports the end wheels of the drills off the ground for transport. Changing the connections to convert from a working hitch to a transport hitch is rapid and simple.

13 Claims, 11 Drawing Figures

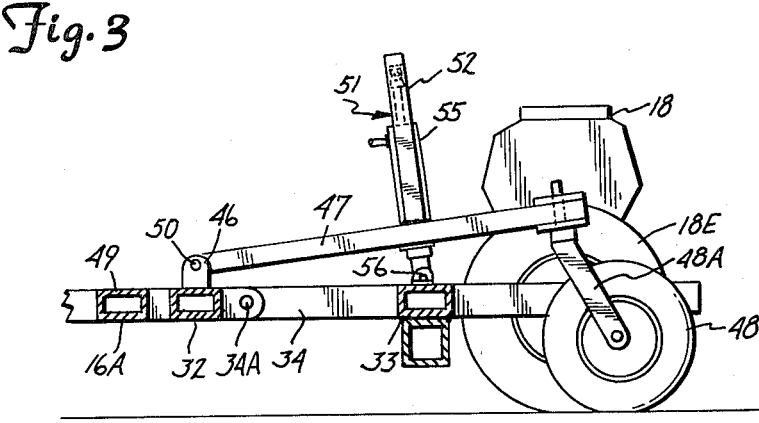
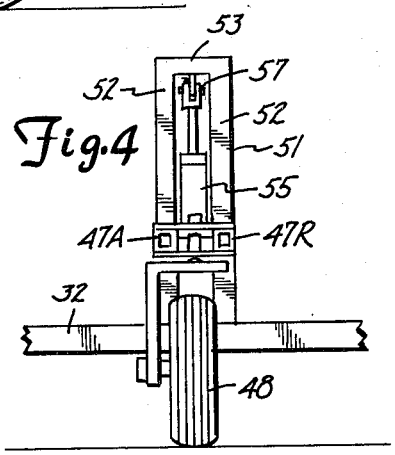
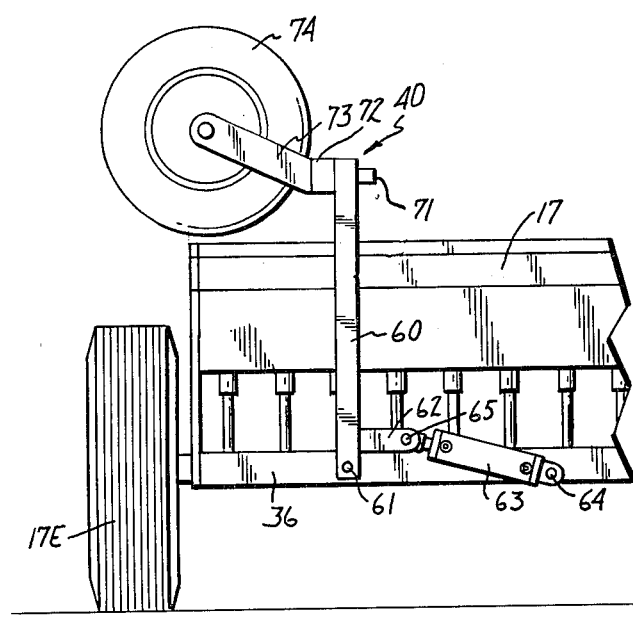
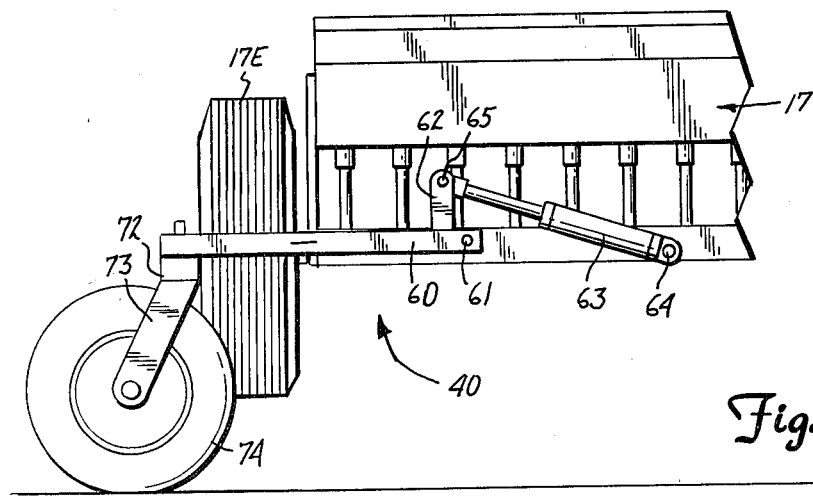

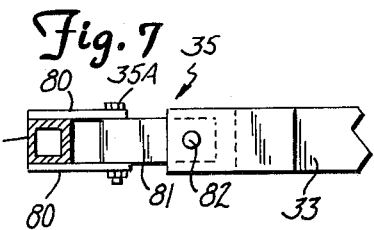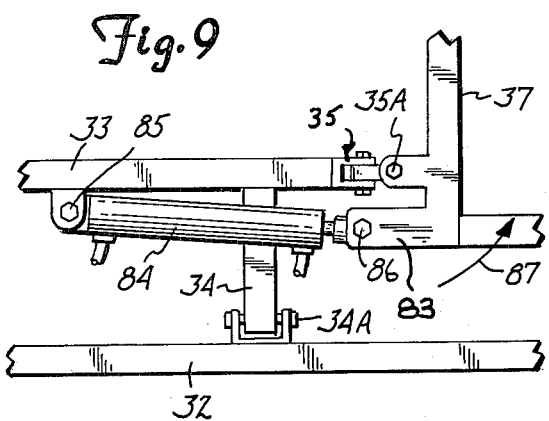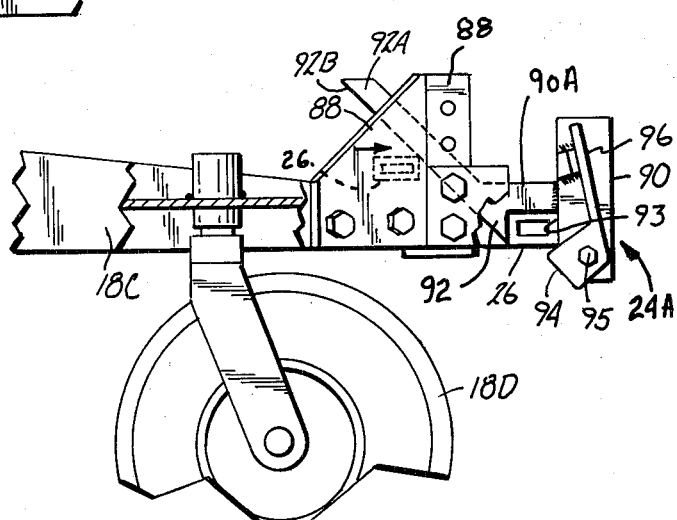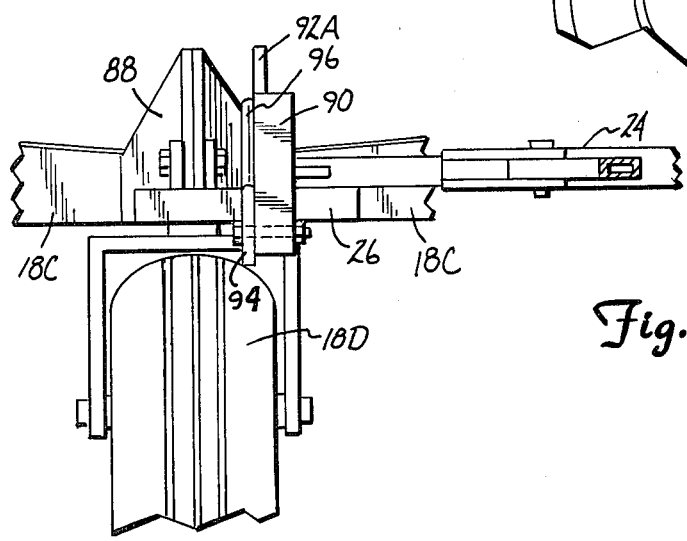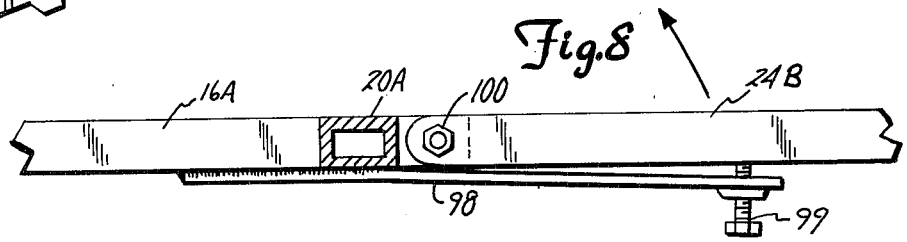

4,360,215

DRILL HITCH TRANSPORT

BACKGROUND OF THE INVENTION

1. Field of the Invention

The present invention relates to a convertible multiple drill hitch for end wheel grain drills.

2. Prior Art

Combined working and transport hitches have been advanced with agricultural machinery in the past. For example. U.S. Pat. No. 4,171,022 illustrates a carrier which as shown appears to be a grain drill utilizing a separate wheeled cart to support the grain drill sections clear of the ground for transport. The plurality of grain drills which are positioned end to end for use, fold forwardly for transport, as shown in FIG. 1, and it appears that the apparatus is primarily designed for fully supporting press wheel grain drills for transport. The same disclosure is present in U.S. Pat. No. 4,214,637.

U.S. Pat. No. 3,548,954 shows a harrow cart that has outer sections folding rearwardly for transport position, and wheels 43 which engage the ground only when the harrow cart is rotated to its position holding the harrow sections out of the ground.

U.S. Pat. No. 3,791,673 shows an implement frame that folds so that the outer sections come forwardly up to the hitch pole, and the wheels of the outer sections are then lifted off the ground for transport.

U.S. Pat. No. 3,971,446 shows an agricultural implement towed by a tractor, with the outer sections of the implement swingable rearwardly for transport.

U.S. Pat. No. 4,157,735 shows a drill carrier that permits pulling the drills from one end upon lowering of wheels that are mounted alongside the front and rear of the machine. The front wheels are the ordinary caster wheels that are used with the drills, but the rear wheels have to be lowered onto the ground to lift the drills before towing. The idea of having wheels which engage the ground selectively for transport is thus disclosed therein.

U.S. Pat. No. 3,705,560 shows the general concept of having wheels which engage the ground for transporting agricultural implements.

U.S. Pat. No. 4,056,149 shows rearward pivoting of the outer sections of an agricultural implement for transporting. Hydraulic cylinders and linkages are operated to cause the outer sections to pivot about upright pivots shown at 24 in the drawings of that patent.

Additional patents uncovered in a preliminary search which are merely of general interest are U.S. Pat. Nos. 3,887,016; 3,986,464; 4,056,149; and 4,109,928. Each of these devices show various state of the art hitches for multiple section implements such as drills or the like.

SUMMARY OF THE INVENTION

The present invention relates to a hitch and transport assembly for hooking together a plurality of end wheel grain drills in an end to end relationship so that the width of the seeding path can be increased by the width of the drills, and having the hitch constructed so that the outer drills may be pivoted rearwardly behind the front drill and held up in position for transport. The transport position reduces the overall width of the unit sufficiently so that the drill can be pulled along roads, and through gates safely.

The hitch of the present invention includes sections that permit the towing of the individual end wheel grain drills in a proper relationship for seeding, and upon actuation of suitable hydraulic cylinders, the end wheel drills can be supported on the front caster wheels used with the end wheel grain drill hitches, and selectively raisable and lowerable support wheels. After the drills are raised to be supported on the transport wheels, upon releasing latches and pulling the unit forward or by operating hydraulic cylinders which are provided the outer drill sections automatically fold behind the front drill for trailing down the road.

Additional features include an automatic operating hitch latch assembly for automatically latching the hitch in its working position when the grain drills are to be restored to an in-line position.

Caster wheels are mounted along the sides of the drill unit to support the side portions of the drill when the drills are being towed to keep the trailing drill assembly relatively level.

BRIEF DESCRIPTION OF THE DRAWINGS

FIG. 3 is a fragmentary sectional view showing a support directly behind the leading grain drill, and a side view of one of the side grain drills;

FIG. 4 is a rear view of the support wheel shown in FIG. 3;

FIG. 5 is a fragmentary rear view of the outer end of one of the trailing grain drills showing a typical support wheel in its raised position for permitting the drills to be used in the field;

FIG. 6 is a view of the apparatus of FIG. 5 showing the auxiliary wheel in its transport position;

FIG. 7 is a fragmentary elevational view of a coupling used between the ends of the grain drills of the present invention;

FIG. 8 is a fragmentary sectional view taken as on line 8—8 in FIG. 1;

FIG. 9 is a top plan view of the connection and control members between the end of the center drill and one outer drill;

FIG. 10 is a side view of a latch operable between a tow bar and the hitch of one end drill; and FIG. 11 is a front view of the latch of FIG. 10.

DESCRIPTION OF THE PREFERRED EMBODIMENT

Figure 1:
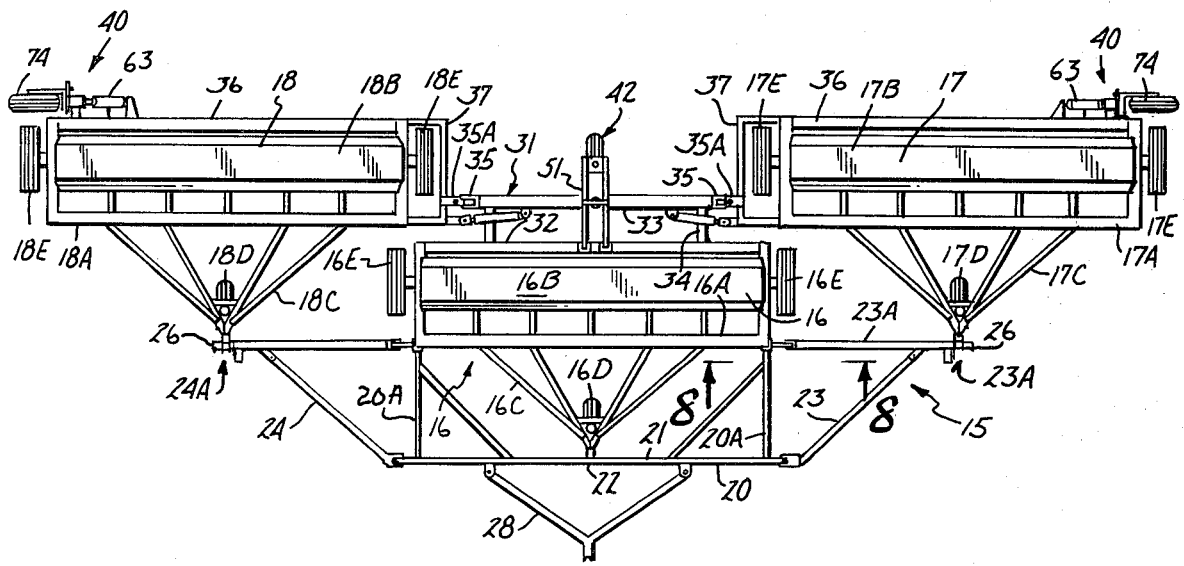
FIG. 1 is a top plan view of three end wheel grain drills in working position utilizing a hitch and transport assembly made according to the present invention.

FIG. 1 is a schematic representation of typical end wheel grain drills, arranged in accordance with the hitch of the present invention. End wheel grain drills are well known, and such drills are supported in use with wheels mounted on the ends of a frame. These drills are different in cross section than press wheel drills. The drill frames are shown schematically in the present drawings, and it is to be understood that with the hitch of the present invention, the drill frame members may be reinforced for supporting the drills. Thus a reference to frames and supports can mean reinforced standard end wheel drill frame, or can be specially built, reinforced frames that would be attached onto the end wheel drills to strengthen the drills. In most instances adding a reinforcing frame is desirable.

In FIG. 1, a multiple drill assembly illustrated generally at 15 comprises a first center drill 16, a second outer drill 17, and a third outer drill 18 positioned outwardly to the opposite lateral sides of the first drill 16.

The standard end wheel drills include main support frames 16A, 17A and 18A. The frames 16A, 17A and 18A are made for supporting drill seed boxes 16B, 17B and 18B, respectively and have rear frame members extending laterally across the drills as well as the forward frame cross members. The forward frame cross members have hitch poles 16C, 17C and 18C, respectively, mounted thereto. The hitch poles on the end wheel grain drills have caster wheels at the front end thereof to support the forward end of the frames. The caster wheels for the drills 16, 17, and 18 are made in any desirable conventional manner. Each of the drills has a pair of end wheels shown at 16E, 17E and 18E which normally support the drills for movement over the ground.

The center drill 16, when modified according to the present invention, includes a hitch attachment frame 20 that has side members attached to the frame cross member of frame 16A and extending forwardly therefrom. Frame 20 has a front cross member 21 that is attached to the center of the hitch pole 16C as at 22. The frame 20 has folding side wing members 23 and 24, respectively, which are pivotally mounted about generally horizontal pivot axes to the outer side edge members of frame 20. The pivotal axes of the wings are aligned with the respective wheels 16E in fore and aft direction.

The wing members 23 and 24 have outer ends which carry latches 23A and 24A, respectively. The leading ends of the hitch poles 17C and 18C have latch bars 26 onto which the latches 23A and 24A latch when the drills are in working position. The wing members 23 and 24 therefore form tow bars for the respective outer drills 17 and 18. The frame 20 also has a forwardly extending hitch pole 28 that is used for attaching the drills to a towing tractor or other prime mover (not shown).

At the rear of the center drill 16, there is a second auxiliary frame 31 mounted. The auxiliary 31 frame has a first lateral cross member 32 that is attached to the rear cross member of the main frame of the drill 16. A plurality of links 34 are pivotally mounted to member 32 about horizontal axes and these links are fixed to a second cross member 33. The outer ends of the cross member 33 support couplings 35 which are also connected to the respective outer drills 17 and 18. The couplings are pivotal connections which permit pivoting in two mutually perpendicular axes, including a horizontal axis, and a vertical axis, and the couplings thus are similar to a universal joint.

The drills 17 and 18 each have auxiliary frames 36 attached thereto, and these auxiliary frames include frame members 37 which surround the inner end wheels of the outer drills. The frames 37 include a member which extends fore and aft, as can be seen in FIG. 1. The fore and aft members of frame 37 have lugs or ears that are pivotally mounted to the respective coupling 35 about a generally upright axis (See FIG. 8).

At the outer end of each of the outer drills 17 and 18, there is an auxiliary transport support wheel assembly 40 mounted. The auxiliary support wheels 40 will be more fully explained, but briefly they are utilized for raising the outer end wheels 17E and 18E of the outer end wheel drills 17 and 18 from the ground when the drills are to be moved from their working position as shown in FIG. 1 to the transport position and also the wheel assemblies 40 support the outer drills during transport. A center transport support wheel 42 which is connected to auxiliary frame 31 of the center drill 16 is utilized for lifting and supporting the inner ends of the drills 17 and 18 for transport. The hitch poles 16C, 17C and 18C are supported on caster wheels 16D, 17D and 18D, respectively. Thus, when the wheel assemblies 40 are operated to raise the outer ends of the outer drills, and wheel 42 is operated to lift the inner ends of these drills (drill 16 remains on the ground) the caster wheels 17D and 18D remain on the ground.

Figure 2:
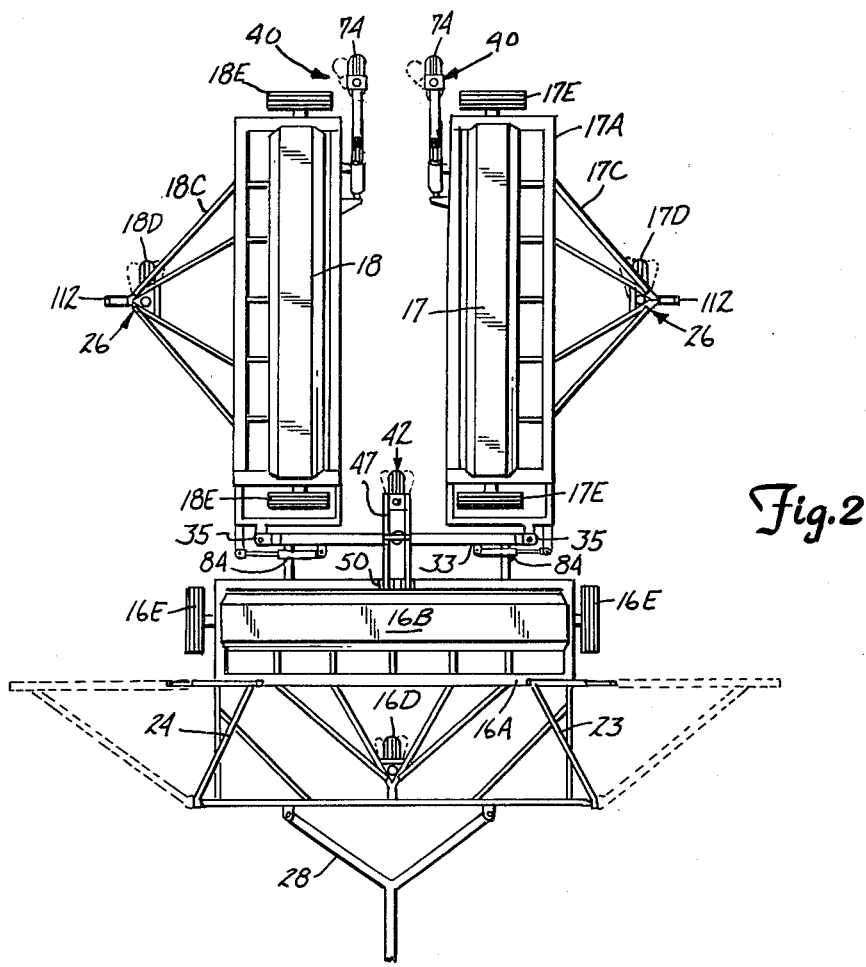
FIG. 2 is a top plan view of the drills of FIG. 1 in a transport position.

To move to transport position, the latch members 23A and 24A are released, (as will be explained,) the drills are supported on their hitch caster wheels and on the wheels assemblies 40 and 42. The outer drills are folded back, which can be done with hydraulic cylinders as shown, or if power operation is not provided, the center drill can be pulled ahead. In either way, the outer drills pivot about the upright pivots shown at 35A forming part of the couplings 35 and the drills 17 and 18 swing rearwardly with the outer ends of the outer drills moving toward each other to the position shown at FIG. 2 for transport. It can thus be seen that with drill 16 remaining on the ground, the frame 31, support wheel 42, wheels 40, and the caster wheels 17D and 18D support the outer drills for movement along the ground. The wings or tow bars 23 and 24 are pivoted upwardly out of working position as shown in FIG. 2 for transport.

Referring now to FIG. 3, the mounting of the wheel assembly 42 to the frame 31 is shown, and the end wheel drill 18 also is shown in position.

The frame detail shows a rear cross member 49 for the frame 16A. Member 32 is fixed to frame 16A and the links 34 are pivoted to member 32 with suitable couplings so the links pivot about pins 34A. A pair of upright ears 46 are welded to the frame member 32, and are used for pivotally mounted frame assembly 47. A caster wheel 48 is mounted to the rear end of the frame 47. The caster wheel 48 is mounted on a center wheel support 48A. The frame assembly 47 comprises a pair of fore and aft members 47A and 47B, which are joined together with suitable cross members. The individual members 47A and 47B are mounted between the ears 46 about a pivot axis 50.

The members 47A and 47B have an upright bridge 51 mounted thereon comprising two upright side by side frame members 52, and a cross member 53 at the upper end of the upright members 52. A hydraulic cylinder 55 is mounted as at 56 to the frame member 33, and its base end, and has a rod end 57 which is attached to a suitable ear 60 on the cross member 53. As shown in FIG. 4, the cylinder 55 is made so that when the rod is retracted the members 52 will push down on the members 47A and 47B and will force the wheel against the ground thereby lifting the frame member 33 as links 34 pivot.

The couplings 35 will cause the end member 37 of the auxiliary frame 36 for the outer drills 17 and 18 to also be lifted so that the wheels 17E and 18E at the inner ends of the outer drills are lifted from the ground.

The wheel assembly 42 is thus used to lift the inner ends of the grain drills 17 and 18 for switching into the transport position, or going from transport to working position, as well as during transport.

Reversing the operation of the hydraulic cylinder 55 will raise the framework 47 and members 47A and 47B and lower the wheels 17E and 18E adjacent the frame 33 back to the ground.

The wheel assemblies 40 at the outer ends of the drills 17 and 18 are shown at FIGS. 5 and 6. These wheels are also caster wheels. The outer wheel 17E is shown in FIG. 5, and the rear frame member 36 as shown has a support arm 60 pivotally mounted thereto as at 61. A double acting hydraulic cylinder 63 is connected to the frame member 36 as at 64 and to the actuator lever 62 as at 65. By operating the cylinder 63 the position of the arm 60 about the pivot 61 can be changed.

The outer end of the arm 60 is used for mounting a caster wheel shaft 71 which supports a yoke 73. The yoke 73 mounts a rotatable wheel 74.

When the wheel assemblies 40 are in raised position, the cylinders 63 are retracted. The cylinders are actuated by operating a suitable valve (not shown) to pivot the arm 60 to the position shown in FIG. 5. When the wheel assemblies 40 are to be utilized for supporting the respective outer drills 17 or 18, the respective cylinders 63 are extended to position as shown in FIG. 6. The arms 60 are forced down so that the wheels 74 support the ends of the drills 17 and 18 with the outer wheels 17E and 18E off the ground.

The cylinders 63 for the wheel assemblies 40 on the opposite ends of the drills 17 and 18 are connected in parallel so that they act substantially simultaneously with a common valve.

The coupling 35 for drill 18 is shown in FIG. 7, and it can be seen that the pivot pin 35A passes through a pair of ears 80, 80 which are welded on the top and bottom of the end members 37 of the end frames of the respective outer drills 17 and 18. The pin 35A passes through a connector link 81, which in turn is pivotally mounted with a pin 82 between a pair of ears mounted on the cross member 33. Thus the link 81 can pivot about a generally horizontal axis, to permit the outer drills to "float". It should also be noted that the wings 23 and 24 also pivot about a horizontal axis. Thus the outer drills may move due to the unevenness in the ground when they are in working position as FIG. 1. The link 81 is quite short, and as the frame member 33 is raised, the couplings 35 lift the inner ends of the frames for the drills 17 and 18 as well.

As shown in FIG. 9, the pivoting or folding of the outer drills about the upright axes or pins 35A of the connectors 35 is done with hydraulic cylinders. If the cylinders are not utilized, the pivoting can be done by releasing the latches 23A and 24A and pulling the center drill ahead to permit the outer drills to fold back, and then holding the outer drills together in some manner so that they don't tend to swing back and forth at their outer ends. This can be done with a simple coupling member or other suitable device.

As shown in FIG. 9 in particular, at each of the inner ends of the frames used for the outer drills, and in particular at the forward ends of the end frame members 37 there is an operator arm 83 fixed to the respective outer drills 17 and 18, and extending laterally from the member 34 in a position slightly ahead of the rear cross member 33. As can be seen the links 34 are spaced inwardly from the ends of the frame 31 so that the actuator arms 83 can be effectively positioned. A hydraulic cylinder indicated at 84, (one for each outer drill) has its first end connected as at 85 to the cross member 33. This can be done through a suitable part spherical rod end connector. The members 34 can be suitably braced to withstand the loads that are encountered in operating the hydraulic cylinder 84. The rod end of the cylinder 84 is connected with a pin 86 that is used to join the rod end to the actuator lever 83 about an upright axis.

The cylinders 84 can be operated by a suitable valve and as the cylinders are extended at the opposite ends of the frame 31, the actuator members will be urged to create a force tending to rotate the outer drills between working and transport position. In FIG. 9 the drill 17 is moved in the direction as indicated by the arrow 87. The outer drills are supported upon the outer caster wheel assemblies 40, including the caster wheels 74, and also supported on the front caster wheels 17D and 18A. (The latches have been disengaged in a manner that will be explained so that the hitch pole 17C and 18C are disconnected). The drills 17 and 18 will then roll around the axes of pins 35A while supported on the caster wheels to a position as shown in FIG. 2. The cylinders 84 will maintain the outer drills in this position during transport, to prevent the outer drills 17 and 18 (which are folded behind the center drill 16) from swaying. The drill assembly thus can be towed down the road and will take up substantially less lateral width than without the folding action.

When the drill assembly is again to be used, the cylinders 84 will be retracted, thereby pulling the outer drills around to their working position.

The latches on the tow bars will be connected so that the tow bars will tow the hitches 17C and 18C and once the wheel assemblies 40 and wheel assembly 42 have been raised off the ground, the drills 17 and 18 will again be supported on their respective end wheels 17E and 18E and the drills will be ready to be used.

In FIGS. 10 and 11 a detailed showing of the latch mechanisms is provided. The forward ends of each of the hitches 17C and 18C as stated have latch bars 26 attached thereto. These latch bars as shown can be vertically adjusted in a normal manner with suitable bracket 88, and the latch bars 26 extend laterally or horizontally and inwardly toward the center drill 16 when the outer drills are in their position as shown in FIG. 1.

The tow bar or wings 23 and 24 as stated, pivot around horizontal pivots from a lowered position shown in FIG. 1 to a raised position shown in FIG. 2, and in FIG. 8, one of the pivots 100 is shown for the tow bar 24.

The latch 24A which is shown in FIG. 10 is positioned on the latch bar 26 for drill hitch 18C. The latch is a relatively simple device which includes a downwardly depending leg 90, which is made so that it will be positioned ahead of the latch bar 26 for the respective outer drill, and a rear member 92 which is attached to an upper cross member 90A fixed to the outer end of the respective tow bar 24 or 23 to define a receptacle 93 that is of size to receive the latch bars 26 of the respective drill.

A latch dog indicated at 94 is pivotally mounted as at 95 to the lower end of each member 90, and is spring loaded with a suitable spring to its position as shown in FIG. 10, but the latch dog will pivot to permit the tow bar receptacle 93 to be positioned over the latch bar 26 as the latch bar 26 and the tow bar 24 move to seat the latch bar. The latch dog 94 has a hand manual release lever 96 that can be used for pivoting the latch dog 94 to a release position when the tow bar is to be released from the latch bar 26. After the latch bars are seated when the unit is to be towed, the member 92 will bear against the respective latch bar 26 and provide a towing force for the respective outer drills. Drawings 94 may be locked closed during use.

A member 92A can be used for automatically latching the hitch pole of the outer drills as they are moved from transport to working position.

In FIG. 8, it can be seen that the tow bars or wings such as the tow bar 24 shown, are pivoted to the fore and aft members 20A of the forward frame 20, about a horizontal pivot axis 100. The tow bars can be supported in a generally horizontal position through the use of a heavy leaf spring member 98 which is fixed at its inner end to the frame 20, and which has an adjustable stop bolt 99 at its outer end. The stop bolt 99 will bear against and support one member of the respective tow bar, such as the member shown at 24B, so that the tow bars will be automatically supported in their generally horizontal position for automatic latching operation.

When the tow bar is in its lowered supported position, the member 92A extends upwardly and rearwardly and provides a guide surface 92B against which the respective latch bar 26 will ride as the outer drills are pivoted into working position using the cylinders 84. The latch dogs 94 pivot out of the way as the member 92 rides over the respective latch bar to permit the tow bar to drop into latched position. Thus, when the drills are to be moved from transport position shown in FIG. 2 tow working position shown in FIG. 1, the tow bars 23 and 24 will be pivoted to the lowered horizontal position as shown in dotted lines in FIG. 2. The stop bolts 99 will support tow bars in their working position (or slightly below working position). When the cylinders 84 are operated to move the outer drills to working position, the latch bars 26 will be guided into the latches (see dotted position in FIG. 10) along the surfaces 92B, lifting the tow bars until the latch bars 26 pass underneath the lugs 92 into the receptacles 93. The latch dogs 94 will pivot out of the way against the spring load to permit the latching action.

When the drills have been moved into position with the latches holding the latch bars 26, the wheels 40 and 42 can be operated to lower the drills back onto their main wheels for use.

When the drills are to be folded for transport, the levers 96 are pulled to release the latch dogs against their spring load, and the tow bars are pivoted up to clear the latch bars 26. The tow bars 23 and 24 may be pivoted upwardly to their nonworking position. This pivoting of the tow bars 23 and 24 also can be done with hydraulic cylinders if desired. The wheel assemblies 40 and 42 are activated to support the outer drills as described, and cylinders 84 operated to fold the outer drills rearwardly.

It should be noted also that the outer drills can be moved from the towing position to the working position by backing up the center drill and moved from working position to transport position by pulling the center drill ahead if the cylinders 84 are not desired. Therefore manual operation is possible as well as all hydraulic operation disclosed.

What is claimed is:

1. A drill hitch and transport assembly for a plurality of end wheel grain drills, each of said grain drills having a drill frame with support wheels at the opposite end of the drills, the improvement comprising hitch means for positioning the drills in working position whereby there is a center drill and at least a pair of outer drills extending laterally from opposite sides of and to the rear of the center drill in a general end to end arrangement and adapted to seed a substantially continuous lateral path as the drills are moved down a field in normal direction, hitch means mounted on the frame of the center drill to permit towing the center drill, said hitch means extending across the lateral width of the center drill and having fore and aft extending side members, first and second tow bar means extending laterally on opposite ends of said center drill and each pivotally mounted to the side members of the hitch means about a generally horizontal axis at least at two positions spaced substantially in fore and aft direction, the tow bar means being pivotally mounted for movement from a first laterally extending position to a position wherein the tow bar means are folded to substantially reduce the lateral extension of the tow bar means, the tow bar means each having outer end portions that extend to substantially the center of the path of the outer drills as the drills are being towed along the ground with the tow bar means in their first position, hitch pole means mounted on each of the outer drills, means to releasably attach each of the hitch pole means of the outer drills to the outer ends of the respective first and second tow bar means, a framework mounted to the rear of the center drill, and means to attach the inner end of each of the outer drills to the framework to retain the inner ends of the outer drills adjacent the center drill to prevent the inner ends from moving laterally inward as the drills are being towed along the ground.

2. In a drill hitch and transport assembly for utilizing at least three drills in generally end to end arrangement for seeding a wider path than a single drill, said drills each comprising a frame having end wheels at the outer ends of the drill, there being a center drill that is positioned ahead of a pair of outer drills extending from opposite sides of said center drill and overlapping the end wheels of the center drill, the improvement comprising a hitch support for holding said drills in end to end relation and permitting the outer drills to be folded to a transport position trailing the center drill, each of said drills having a forwardly directed hitch pole, tow bar means mounted with respect to said center drill and extending laterally outwardly from opposite sides thereof, means to connect the hitch poles of each of the outer drills to one of said tow bar means, respectively, a first frame attached to and positioned rearwardly of the center drill, means to pivotally mount the inner ends of the outer drills to said first frame about at least an upright axis whereby said outer drills may pivot about the upright axis to a transport position with the outer drills generally parallel to each other and parallel to the direction of travel, hitch wheel means for supporting the hitch poles of the outer drills when the outer drills are folded to transport position, first wheel means at the outer ends of each of the outer drills operable to lift and support the outer ends of said outer drills for transport, and adjustment means for moving said first wheel means to a position wherein they clear the ground during use of the drills.

3. The apparatus of claim 2 and second wheel means to raise the inner ends of said outer drills so that the normal end wheels at said inner ends are raised from the ground and the two outer drills are supported on the hitch wheel means, and the first and second wheel means.

4. The apparatus of claim 3 wherein said first and second wheel means comprise caster wheels.

5. The apparatus of claim 3 wherein said tow bar means are pivotally mounted about generally horizontal fore and aft extending axes, and are foldable from a generally horizontal position for working, to a position wherein they are generally within the lateral side edges of the center drill.

6. The apparatus of claim 3 wherein said means to pivotally mount the inner ends of the outer drills to the first frame comprise a connection that permits limited universal movement about a horizontal axis as well as about the upright axis.

7. The apparatus of claim 2 and hydraulic cylinder means connected between the center drill and the outer drills to control movement of the outer drills about the upright axis of the means to pivotally mount as the outer drills are folded to transport position.

8. The apparatus of claim 7 wherein said means to connect the hitch poles comprises a spring loaded releasable latch on the tow bar means, means to support the tow bar means generally horizontal with respect to the center drill, a latch bar on the hitch poles of the outer drills, and guide means on each of the releasable latches to engage the respective latch bar as the outer drills are pivoted from transport position to working position and to guide the latch bars into operative engagement with the latch on the respective tow bar means.

9. In a drill hitch and transport assembly for a plurality of end wheel grain drills, each of said grain drills having a drill frame with support wheels at the opposite end of the drills, the improvement comprising hitch means for positioning the drills in working position whereby there is a center drill and outer drills extending laterally from the center drill in end to end arrangement and adapted to seed a continuous path as the drills are moved down a field in normal direction, hitch means to permit towing the center drill, means supported on the hitch means to tow the outer drills, respectively, said means to tow comprising first and second tow bar means extending laterally on opposite ends of said center drill, means to support said tow bar means at a desired lateral position, hitch pole means mounted on each of the outer drills, means for supporting the outer ends of the hitch pole means at a desired level relative to the ground, means for attaching each of the hitch pole means of each of the outer drills to the respective first and second tow bar means including a latch mechanism operable between each of the hitch pole means and the respective tow bar means and comprising a latch dog means on each latch mechanism that will automatically latch as the hitch pole means are moved toward the respective tow bar means and are supported by the means for supporting to permit towing the outer drills with the tow bar means when the latch mechanism is latched, a first framework mounted to the center drill, and means to attach the inner end of each of the outer drills to the first framework to retain the ends of the outer drills adjacent the center drill to prevent the inner ends from moving laterally inward as the drills are being towed.

10. The apparatus of claim 9 wherein said means to support comprises a resilient leaf spring member adapted to limit the downward movement of said tow bar means.

11. A drill hitch and transport assembly for a plurality of end wheel grain drills, each of said grain drills having a drill frame with support wheels at the opposite end of the drill frames, comprising hitch means for positioning the drills whereby there is a center drill and outer drills extending laterally from the center drill in end to end arrangement and adapted to seed a continuous path as the drills are moved along a field in normal direction, means to permit towing the center drill, means supported on the hitch means to tow the outer drills, respectively, said means to tow comprising first and second tow bar means extending laterally on opposite ends of said center drill, hitch pole means on each of the outer drills, means to releasably attach the hitch pole means of each of the outer drills to the respective first and second tow bar means, a first framework mounted to the center drill, means to attach the inner end of each of the outer drills to the first framework to retain the ends of the outer drills adjacent the center drill to prevent the inner ends from moving laterally as the drills are being towed comprising a pivot member permitting pivoting of the outer drills about an upright axis relative to the first framework, first and second caster wheels, means for mounting one of the first and second caster wheels on each of the drill frames of said outer drills, respectively, said caster wheels being mounted for movement about generally horizontal pivot axes, means for selectively moving each of the first and second caster wheels, respectively, about their pivot axis from a position wherein the support wheels at the outer ends of the respective outer drills are lifted from the ground to a position wherein the caster wheels clear the ground, and third wheel means movably mounted to said center drill frame, means for selectively moving the third wheel means from a first position wherein the third wheel means clears the ground to a second position wherein the third wheel means engages the ground and raises the support wheels at the inner ends of the outer drills from the ground, each of said drills including forward caster wheel means supporting the forward ends of the drills and to support the drills in cooperation with the first and second caster wheels and the third wheel means when the support wheels of the outer drills are lifted from the ground to permit the outer drills to move about the upright axis to position to trail the center drill.

12. The apparatus of claim 11 and hydraulic cylinder means connected between the center drill and each of the outer drills to control movement of the outer drills about the upright pivot axis of the respective pivot member when the means to releasably attach is released.

13. The apparatus of claim 11 wherein said means to attach the inner ends of said outer drills to the first framework comprises a pivot member which permits limited movement in vertical direction to thereby permit said third wheel means to lift the inner ends of the outer drills.

* * * * *

UNITED STATES PATENT AND TRADEMARK OFFICE
CERTIFICATE OF CORRECTION

PATENT NO. : 4,360,215

DATED : November 23, 1982

INVENTOR(S) : Arthur H. Nohl; DeWayne A. Nohl; Alvin L. Nohl, Jr.

It is certified that error appears in the above-identified patent and that said Letters Patent is hereby corrected as shown below:

Column 9, Line 52 (Claim 9, line 23), after "each" insert --said--.

Signed and Sealed this

Twenty-second Day of February 1983

[SEAL]

Attest:

GERALD J. MOSSINGHOFF

Attesting Officer

Commissioner of Patents and Trademarks